US012658021B2

(12) United States Patent
Whilden, Jr. et al.

(10) Patent No.: US 12,658,021 B2
(45) Date of Patent: Jun. 16, 2026

(54) APPARATUS FOR ROTATING A SUCKER ROD STRING HAVING A POSITION INDICATOR

(71) Applicants: Tom C. Whilden, Jr., Oklahoma City, OK (US); Tom C. Whilden, III, Oklahoma City, OK (US)

(72) Inventors: Tom C. Whilden, Jr., Oklahoma City, OK (US); Tom C. Whilden, III, Oklahoma City, OK (US)

( * ) Notice: Subject to any disclaimer, the term of this patent is extended or adjusted under 35 U.S.C. 154(b) by 0 days.

(21) Appl. No.: 19/341,702

(22) Filed: Sep. 26, 2025

(65) Prior Publication Data

US 2026/0087924 A1    Mar. 26, 2026

Related U.S. Application Data

(60) Provisional application No. 63/699,308, filed on Sep. 26, 2024.

(51) Int. Cl.
*G08B 21/18*        (2006.01)
*E21B 47/009*      (2012.01)
*F16H 37/12*        (2006.01)

(52) U.S. Cl.
CPC .......... *G08B 21/187* (2013.01); *E21B 47/009* (2020.05); *F16H 37/122* (2013.01)

(58) Field of Classification Search
CPC .... G08B 21/187; E21B 47/009; F16H 37/122
USPC ........................................................ 340/679
See application file for complete search history.

(56) References Cited

U.S. PATENT DOCUMENTS

| | | | |
|---|---|---|---|
| 9,140,113 B2 | 9/2015 | Hurst | |
| 11,542,938 B2 | 1/2023 | Zhao | |
| 11,549,316 B2 | 1/2023 | Cortes | |
| 11,572,770 B2 | 2/2023 | Sengul | |
| 11,814,948 B2 * | 11/2023 | Phillips | ................. E21B 47/009 |
| 2006/0000605 A1 | 1/2006 | Jordan | |
| 2020/0263531 A1 | 8/2020 | Fyfe | |
| 2022/0154539 A1 * | 5/2022 | Cortes | ................. E21B 17/1071 |
| 2022/0236082 A1 | 7/2022 | Navar | |
| 2023/0184089 A1 * | 6/2023 | Treiberg | ............... E21B 47/092 |
| | | | 702/6 |
| 2024/0167375 A1 | 5/2024 | Phillips | |

* cited by examiner

*Primary Examiner* — Kerri L Mcnally
(74) *Attorney, Agent, or Firm* — Dunlap Codding, P.C.

(57)                    ABSTRACT

Apparatuses, sensor assemblies, and methods are described herein, including a sensor assembly comprising a relay, a speed switch, and a sensor controller. The relay is switchable between a first state and a second state and is initially in the first state. The speed switch is sized and dimensioned for insertion within an inner cavity of a housing of an apparatus for rotating a sucker rod string. The speed switch is configured to detect movement of a driven gear of the apparatus and, responsive to determining that the driven gear has ceased movement, switch the relay from the first state to the second state. The sensor controller is configured to, responsive to determining that the relay has been in the second state for a predetermined time period, generate an alarm indicating that the driven gear has ceased rotation.

19 Claims, 8 Drawing Sheets

216

700b

800

700a 704b    704a

404b

130b

312

320

324

404c    400    900

404a    116

1200 ⬊

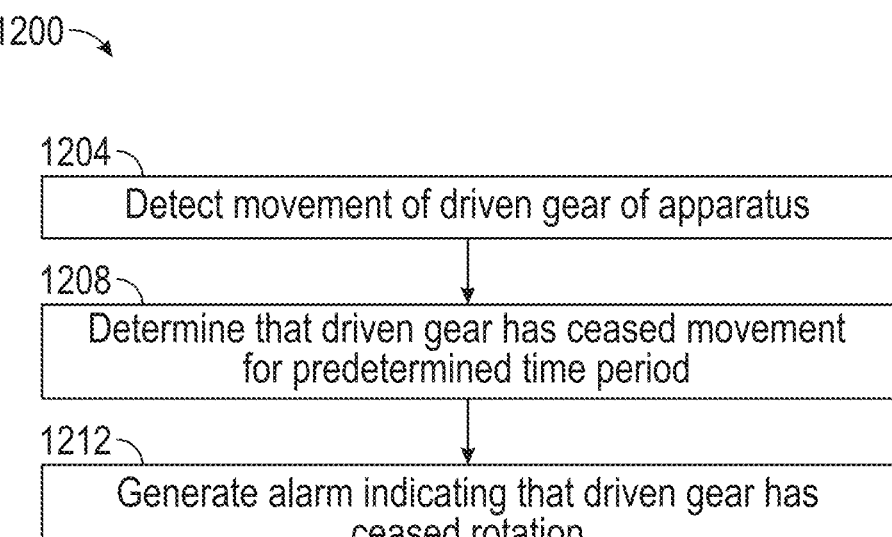

1204 ⬞
Detect movement of driven gear of apparatus

1208 ⬞
Determine that driven gear has ceased movement for predetermined time period 1212 ⬞
Generate alarm indicating that driven gear has ceased rotation

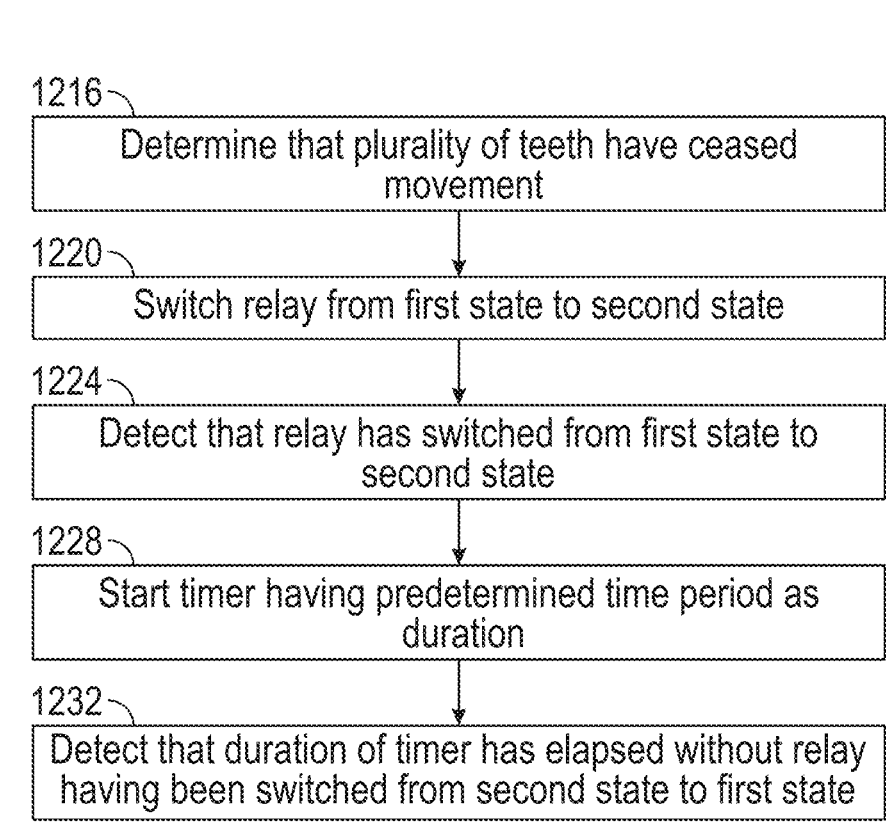

1216 ⬞
Determine that plurality of teeth have ceased movement

1220 ⬞
Switch relay from first state to second state

1224 ⬞
Detect that relay has switched from first state to second state

1228 ⬞
Start timer having predetermined time period as duration

1232 ⬞
Detect that duration of timer has elapsed without relay having been switched from second state to first state

FIG. 12B

APPARATUS FOR ROTATING A SUCKER ROD STRING HAVING A POSITION INDICATOR

CROSS-REFERENCE TO RELATED APPLICATIONS

This application claims the benefit of U.S. Provisional Application No. 63/699,308, filed Sep. 26, 2024, which is hereby incorporated herein by reference in its entirety.

BACKGROUND

In artificial lift systems used in oil and gas production, ensuring the continuous rotation of the sucker rod string is critical for maintaining the longevity and efficiency of the equipment. As the sucker rod string operates, it is subjected to constant friction and wear. By promoting consistent rotation, this wear is evenly distributed across the entire outer surface of the sucker rod string, rather than being concentrated on a single area. This even distribution of wear significantly extends the operational lifespan of the sucker rod string, reduces the frequency of replacements, and minimizes the risk of premature failures that could lead to costly downtime and repairs.

Rod rotators play a vital role in achieving this continuous rotation of the sucker rod string. These apparatuses are typically installed on the pumping unit and are designed to incrementally rotate the sucker rod string during each stroke of the pumping unit. However, rod rotators are subject to certain limitations and vulnerabilities. One of the most critical components of a rod rotator is its gear mechanism, which is responsible for transmitting the rotational force to the sucker rod string. Over time, this gear can become damaged or broken due to the repetitive stress of operation, environmental factors, or manufacturing defects. When the gear fails, the rod rotator ceases to function effectively, compromising the even wear distribution on the sucker rod string and potentially leading to accelerated equipment degradation.

While existing rod rotators often incorporate sensors to detect when the gear is damaged or broken, these monitoring systems have significant shortcomings. Most commonly, these sensors track the movement of the cap of the rod rotator as an indirect measure of gear functionality. This approach is unreliable for accurately determining whether the gear of the rod rotator is genuinely broken or damaged. The movement of the cap may not always correlate directly with the condition of the gear, leading to potential false positives or, more dangerously, false negatives in fault detection. Consequently, this inadequate monitoring can result in undetected gear failures, allowing the sucker rod string to operate without proper rotation for extended periods, thereby negating the benefits of even wear distribution and potentially leading to premature system failures.

SUMMARY OF THE INVENTIVE CONCEPTS

In one implementation, the inventive concepts disclosed herein are directed an apparatus for rotating a sucker rod string, comprising: a housing defining an inner cavity, an upper opening, and a lower opening, the lower opening sized and dimensioned to receive a first portion of the sucker rod string; a cap disposed over the upper opening of the housing, the cap defining a rod opening aligned with the lower opening of the housing to receive a second portion of the sucker rod string spaced from the first portion, the cap engageable with the sucker rod string such that rotation of the cap causes rotation of the sucker rod string; an actuator arm extending from the housing, the actuator arm moveable between a first position and a second position; a driving gear disposed within the inner cavity of the housing, the driving gear mechanically coupled to the actuator arm such that movement of the actuator arm between the first position and the second position causes rotation of the driving gear; a driven gear disposed within the inner cavity of the housing, the driven gear in meshing engagement with the driving gear such that rotation of the driving gear causes rotation of the driven gear, the driven gear coupled to the cap such that rotation of the driven gear causes corresponding rotation of the cap; and a sensor assembly disposed within the inner cavity of the housing, the sensor assembly configured to detect movement of the driven gear and, responsive to determining that the driven gear has ceased movement for a predetermined time period, generate an alarm indicating that the driven gear has ceased rotation.

In another implementation, the inventive concepts disclosed herein are directed to a sensor assembly, comprising: a relay switchable between a first state and a second state, the relay initially in the first state; a speed switch sized and dimensioned for insertion within an inner cavity of a housing of an apparatus for rotating a sucker rod string, the speed switch configured to detect movement of a driven gear of the apparatus and, responsive to determining that the driven gear has ceased movement, switch the relay from the first state to the second state; and a sensor controller configured to, responsive to determining that the relay has been in the second state for a predetermined time period, generate an alarm indicating that the driven gear has ceased rotation.

In yet another implementation, the inventive concepts disclosed herein are directed to a method, comprising: detecting, by a sensor assembly disposed within an inner cavity of a housing of an apparatus for rotating a sucker rod string, movement of a driven gear of the apparatus; determining, by the sensor assembly, that the driven gear has ceased movement for a predetermined time period; and responsive to determining that the driven gear has ceased movement for the predetermined time period, generating an alarm indicating that the driven gear has ceased rotation.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic form in the interest of clarity and conciseness. Not every component may be labeled in every drawing. Like reference numerals in the figures may represent and refer to the same or similar element or function. In the drawings:

FIG. 12A is a diagrammatic view of an exemplary implementation of a method of using the apparatus shown in FIG. 1.

FIG. 12B is a diagrammatic view of a method of determining whether the driven gear has ceased movement for a predetermined time period.

DETAILED DESCRIPTION OF EXEMPLARY EMBODIMENTS

Figure 1:
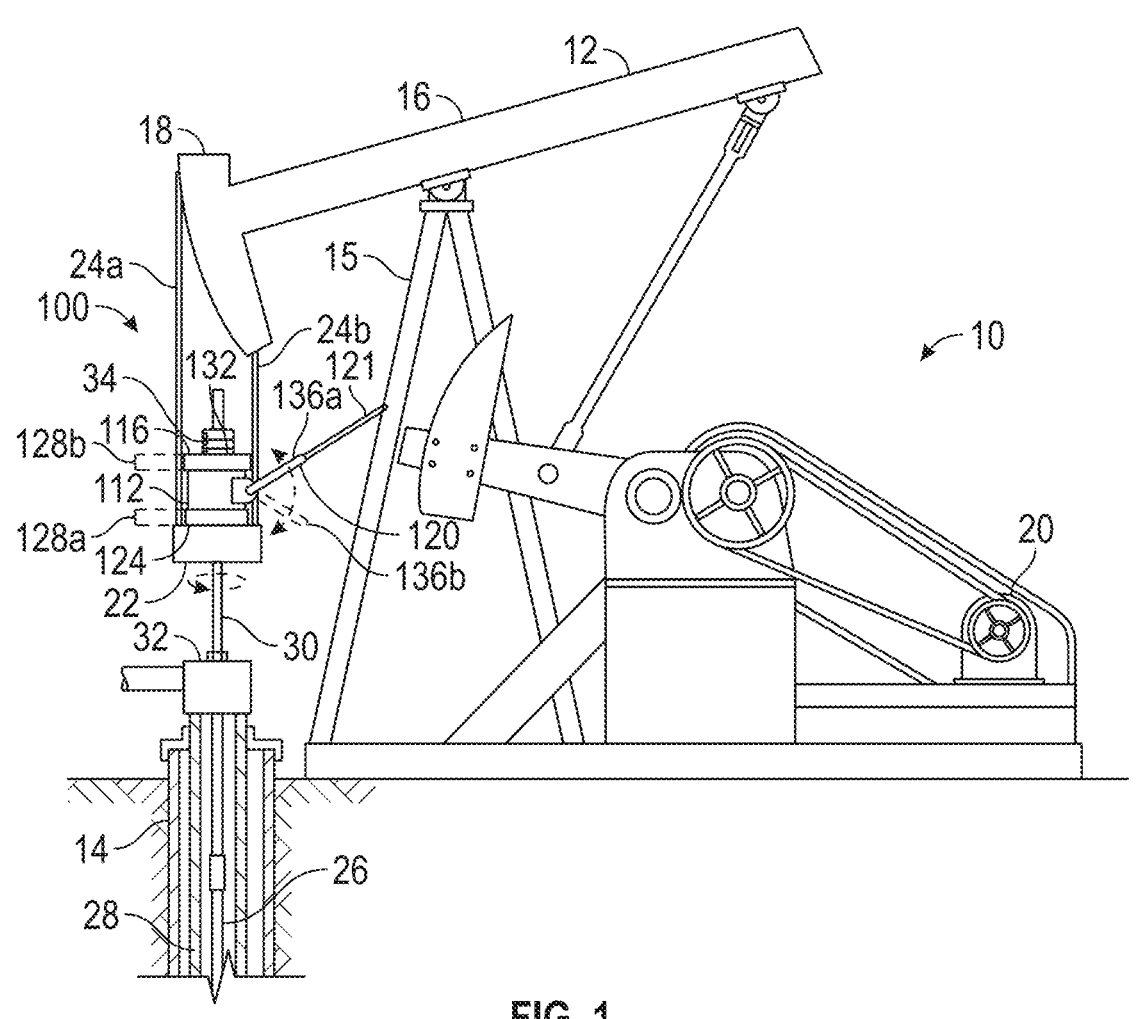
FIG. 1 is a side elevational view of an exemplary implementation of an apparatus for rotating a sucker rod string constructed in accordance with the inventive concepts disclosed herein, shown connected to a sucker rod string.

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for the purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the terms "comprises," "comprising," "includes," "including," "has," "having", or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any of the following: A is true (or present) and B is false (or not present), A is false (or not present) and B is true (or present), and both A and B are true (or present).

In addition, the use of the "a" or "an" is employed to describe elements and components of the implementations herein. This is done merely for convenience and to give a general sense of the inventive concept. This description should be read to include one or more, and the singular should also include the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein, any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Referring now to the drawings, and in particular to FIG. 1, one version of a conventional beam pumping unit 10 is illustrated. The pumping unit 10 includes a pump jack 12 that drives a downhole reciprocating pump (not shown) located in a wellbore 14. The pump jack 12 has a Sampson post 15 supporting a walking beam 16 with a horse head 18 located at one end. Activation of a primary mover 20 causes the horse head 18 to deliver a reciprocal pumping stroke to the downhole pump. A carrier bar 22 is suspended from bridle cables 24a and 24b which roll tangentially over the horse head 18 as it reciprocates. A string of sucker rods 26 is suspended from the carrier bar 22, and the sucker rod string 26 extends down production tubing 28 to drive the pump.

A polished rod 30 is connected to the top of the sucker rod string 26. The polished rod 30 extends through a stuffing box 32 and through the carrier bar 22. A rod clamp 34 is secured to the polish rod 30 above the carrier bar 22 to support the sucker rod string 26 while the weight is carried by the bridle cables 24a and 24b and the carrier bar 22.

An apparatus 100, constructed in accordance with the inventive concepts disclosed herein, for rotating the sucker rod string 26 is positioned between the carrier bar 22 and the rod clamp 34 with the polished rod 30 extending therethrough. As shown in FIG. 1, the apparatus 100 generally comprises a housing 112, a cap 116 disposed over an upper opening 204 (shown in FIG. 4) of the housing 112, and an actuator arm 120 extending from the housing 112. The actuator arm 120 is connected to the Sampson post 15 with a cable 121 in a way that movement of the horse head 18 causes movement of the actuator arm 120.

The housing 112 defines the upper opening 204 and a lower opening 124. The lower opening 124 is sized and dimensioned to receive a first portion 128a of the sucker rod string 26. The cap 116 has a top cap end 130a and a bottom cap end 130b opposite the top cap end 130a and defines a rod opening 132 extending between the top cap end 130a and the bottom cap end 130b and at least partially aligned with the lower opening 124 of the housing 112. The rod opening 132 is sized and dimensioned to receive a second portion 128b of the sucker rod string 26 spaced from the first portion 128a of the sucker rod string 26.

The cap 116 is frictionally engageable with the rod clamp 34 such that rotation of the cap 116 causes rotation of the sucker rod string 26. Further, the actuator arm 120 is moveable between a first position (indicated in FIG. 1 by dotted outline 136a) (hereinafter, the "first position 136a") and a second position (indicated in FIG. 1 by dotted outline 136b) (hereinafter, the "second position 136b) and is configured to move between the first position 136a and the second position 136b during operation of the beam pumping unit 10. The apparatus 100 is thus configured to rotate the cap 116—and thus, the sucker rod string 26—in response to the actuator arm 120 moving between the first position 136a and the second position 136b during operation of the beam pumping unit 10.

Figure 2:
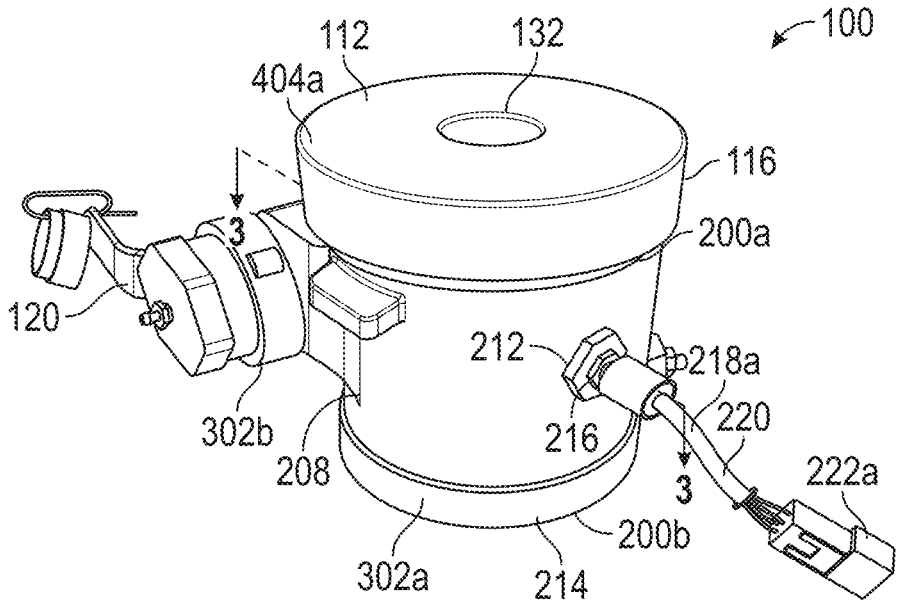
FIG. 2 is a perspective view of the apparatus of FIG. 1.

Referring now to FIG. 2, the housing 112 may have a top end 200a defining the upper opening 204, a bottom end 200b opposite the top end 200a and defining the lower opening 124, and a sidewall 208 extending between the top end 200a and the bottom end 200b.

The sidewall 208 may define a side opening 212 into the inner cavity 300 (shown in FIG. 3) of the housing 112 between the top end 200a and the bottom end 200b, and may define a raised rim 214 adjacent to the bottom end 200b. A bushing 216 may be disposed within the side opening 212. As described in more detail below, a sensor probe 314 (shown in FIG. 3) of a sensor assembly 316 (shown in FIG. 5) may extend through the bushing 216.

In some implementations, a lead 220 has a first lead portion 218a extending from the sensor probe 314 (shown in FIG. 3) of the sensor assembly 316 (shown in FIG. 5) having a first connector portion 222a and a second lead portion 218b (shown in FIG. 5) extending from a sensor controller 500 (shown in FIG. 5) of the sensor assembly 316 having a second connector portion 222b configured to be releasably coupled to the first connector portion 222a.

Figure 3:
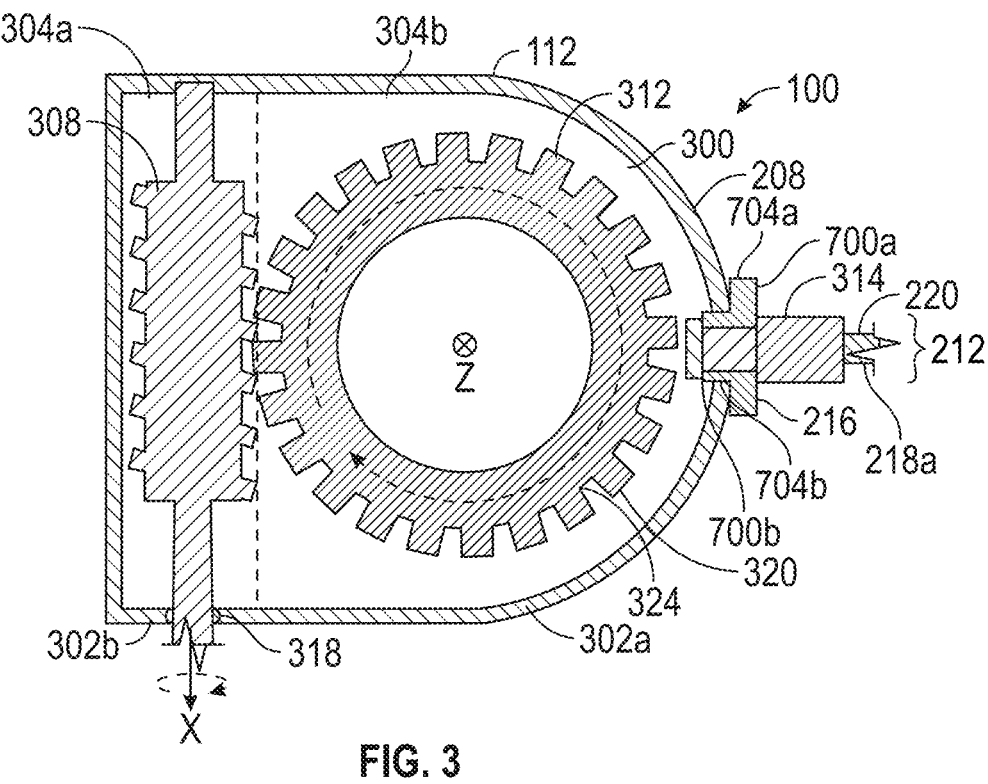
FIG. 3 is a cross-sectional view taken along line 3-3 of FIG. 2.

Referring now to FIG. 3, shown therein is a partial cross-sectional view of the apparatus 100 shown in FIG. 2, taken along line 3-3. As shown in FIG. 3, the sidewall 208 of the housing 112 defines an inner cavity 300, a first housing portion 302a of the housing 112 defining a screw portion 304a of the inner cavity 300, and a second housing portion 302b of the housing 112 defining a gear portion 304b of the inner cavity 300.

A driving gear 308 may be disposed within the screw portion 304a of the inner cavity 300 and may be mechanically coupled to the actuator arm 120 disposed outside of the inner cavity 300 such that movement of the actuator arm between the first position 136a and the second position 136b causes rotation of the driving gear 308. As shown in FIG. 3, the driving gear 308 may have a cylindrical body. Further, a driven gear 312 may be disposed within the gear portion 304b of the inner cavity 300 and may be in meshing engagement with the driving gear 308 such that rotation of the driving gear 308 causes rotation of the driven gear 312.

One or more of the driving gear 308 and the driven gear 312 may be constructed using an electrically conductive material.

As further shown in FIG. 3, the sensor probe 314 of the sensor assembly 316 (shown in FIG. 5) may be disposed at least partially within the inner cavity 300. The sensor probe 314 may be configured to detect movement of the driven gear 312 and, responsive to determining that the driven gear 312 has ceased movement for a predetermined time period (e.g., between one minute and ten minutes, such as four minutes), generate an alarm indicating that the driven gear 312 has ceased rotation. The sensor probe 314 may be electrically connected to the lead 220.

In some implementations, the driving gear 308 and the driven gear 312 collectively form a worm drive. In such implementations, the driving gear 308 is a worm screw having a cylindrical body configured to rotate about a first rotational axis x, the driven gear 312 is a worm gear having a disc-shaped body configured to rotate about a second rotational axis z, and the first rotational axis x and the second rotational axis z are perpendicular. The driving gear 308 may have a gasket 318 disposed about the cylindrical body of the driving gear 308 to prevent slippage of the driving gear 308 within the screw portion 304a of the inner cavity 300 of the housing 112.

The driven gear 312 may have a plurality of teeth 320 circumferentially spaced about the driven gear 312, with one of a plurality of spaces 324 between each of the teeth 320. For purposes of clarity, only one of the teeth 320 and only one of the spaces 324 are labeled with a reference character. The sensor probe 314 may be configured to detect movement of the teeth 320 of the driven gear 312. The sensor probe 314 may be further configured to, responsive to determining that the teeth 320 have ceased movement for the predetermined time period, generate the alarm indicating that the driven gear 312 has ceased rotation.

Figure 4:
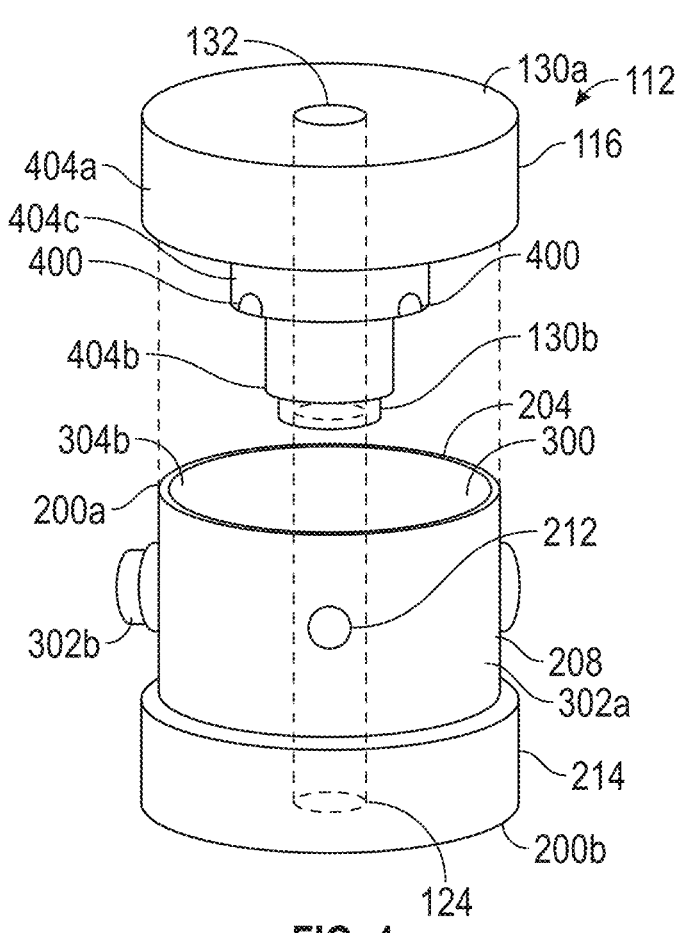
FIG. 4 is an exploded perspective view of a housing of the apparatus.

Referring now to FIG. 4, shown therein is an exploded perspective view of the housing 112 shown in FIG. 1. As described above, the housing 112 defines the inner cavity 300 having the screw portion 304a (shown in FIG. 3) and the gear portion 304b, the upper opening 204 into the inner cavity 300, the lower opening 124 into the inner cavity 300, and the side opening 212 into the inner cavity 300. The lower opening 124 is sized and dimensioned to receive the first portion 128a of the sucker rod string 26.

As further described above, the cap 116 is disposed over the upper opening 204 and defines the rod opening 132, which is aligned with the lower opening 124 to receive the second portion 128b of the sucker rod string 26 spaced from the first portion 128a of the sucker rod string 26. The cap 116, via the rod opening 132, is engageable with the sucker rod string 26 such that rotation of the cap 116 causes rotation of the sucker rod string 26. As will be described in more detail below, the cap 116 may define one or more sockets 400.

As shown in FIG. 4, the cap 116 may have an external portion 404a having a first diameter and extending from the top cap end 130a, a gear shaft portion 404b having a second diameter less than the first diameter and extending from the bottom cap end 130b, and a gear seat portion 404c having a third diameter between the first diameter and the second diameter and extending between the external portion 404a and the gear shaft portion 404b. As shown in FIG. 4, the one or more sockets 400 may be defined by the gear seat portion 404c of the cap 116.

Figure 5:
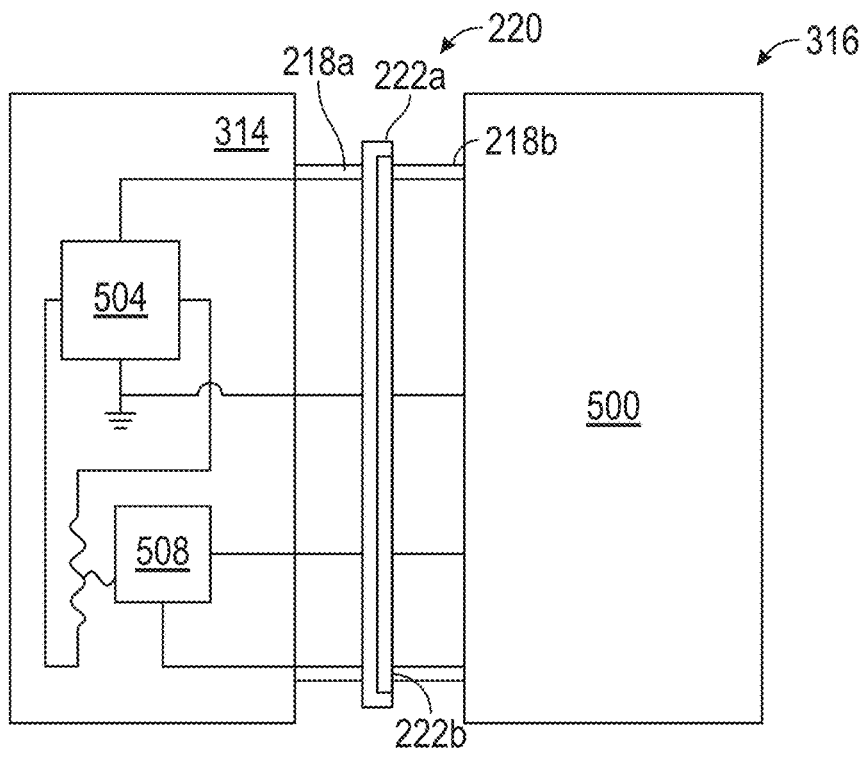
FIG. 5 is a diagrammatic view of an exemplary implementation of a sensor assembly constructed in accordance with the inventive concepts disclosed herein.
Figure 6:
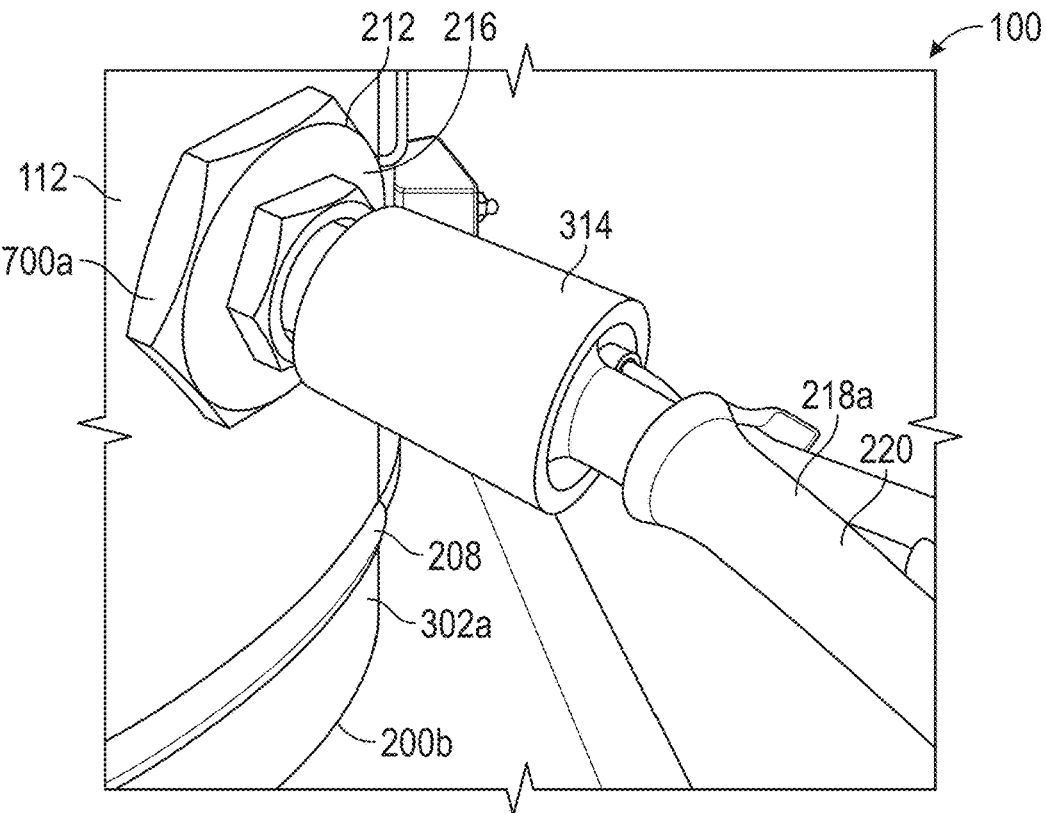
FIG. 6 is a partial perspective view of the sensor assembly shown connected to a bushing.
Figure 7:
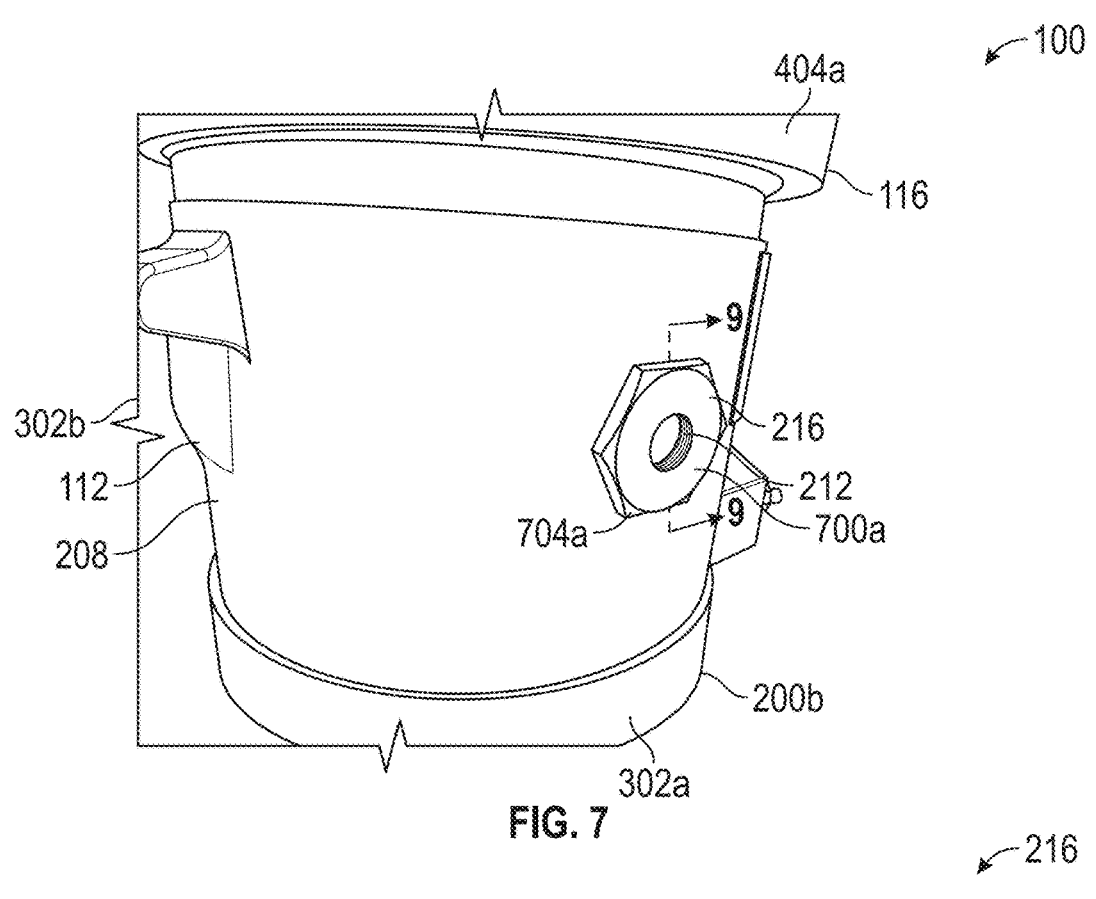
FIG. 7 is a partial perspective view of the housing of FIG. 4 with the sensor assembly removed from the bushing.

Referring now to FIG. 5, shown therein is an exemplary implementation of the sensor assembly 316, illustrating that the lead 220 is electrically coupled to the sensor probe 314 and a sensor controller 500. The sensor controller 500 may be disposed outside of the housing 112. The sensor probe 314 generally comprises a speed switch 504 and a relay 508.

The speed switch 504 may be configured to detect movement of the driven gear 312—or the teeth 320 of the driven gear 312, in some implementations—and, responsive to determining that the driven gear 312—or the teeth 320—has ceased movement for the predetermined time period, send signals to the sensor controller 500 via the lead 220 to cause the sensor controller 500 to generate the alarm indicating that the driven gear 312 has ceased rotation. In some implementations, the speed switch 504 is a ferrous target speed switch configured to detect movement of an object by sensing the presence of ferrous (i.e., iron-containing) materials. In such implementations, the driven gear 312 and/or one or more of the teeth 320 of the driven gear 312 may be constructed using a ferrous metal.

The relay 508 may be switchable between a first state and a second state and is initially in the first state. In some implementations, the relay 508 is a normally open relay (i.e., the first state is "open" and the second state is "closed"). However, in other implementations, the relay 508 is a normally closed relay (i.e., the first state is "closed" and the second state is "open").

In some implementations, the speed switch 504 is further configured to detect movement of the teeth 320 of the driven gear 312 and, responsive to determining that the teeth 320 of the driven gear 312 have ceased movement for the predetermined time period, switch the relay 508 from the first state to the second state.

The sensor controller 500 may be configured to, responsive to determining that the relay 508 has been in the second state for the predetermined time period, generate the alarm indicating that the driven gear 312 has ceased rotation. In some implementations, the sensor controller 500 may be, for example, one or more of a pump-off controller, a production monitoring system, and/or the like. In other implementations, the sensor controller 500 may communicate with one or more user systems (e.g., one or more of a pump-off controller, a production monitoring system, and/or the like) to provide the alarm indicating that the driven gear 312 has ceased rotation.

Figure 8:
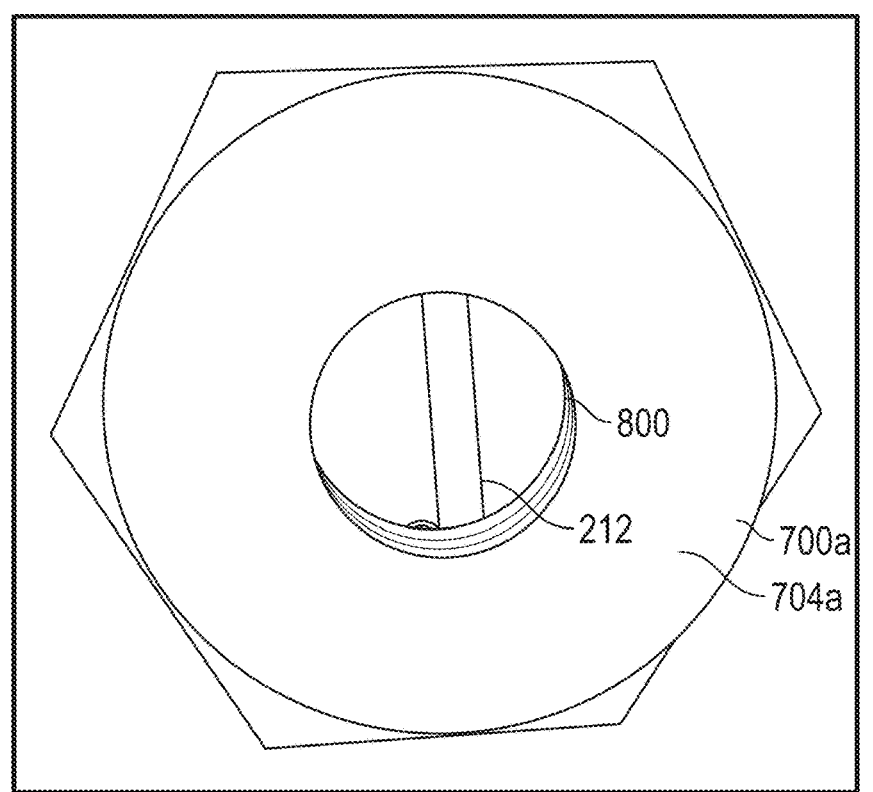
FIG. 8 is a front elevational view of the bushing of FIG. 7.
Figures 9, 10A:
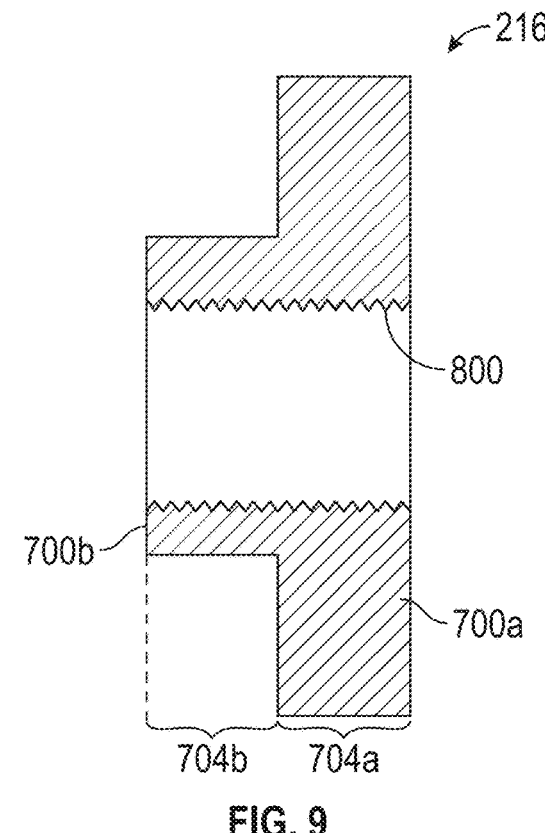
FIG. 9 is a cross-sectional view of the bushing taken along line 9-9 of FIG. 7.
FIG. 10A is a perspective view of a cap shown with a driven gear positioned thereon.
Figure 10B:
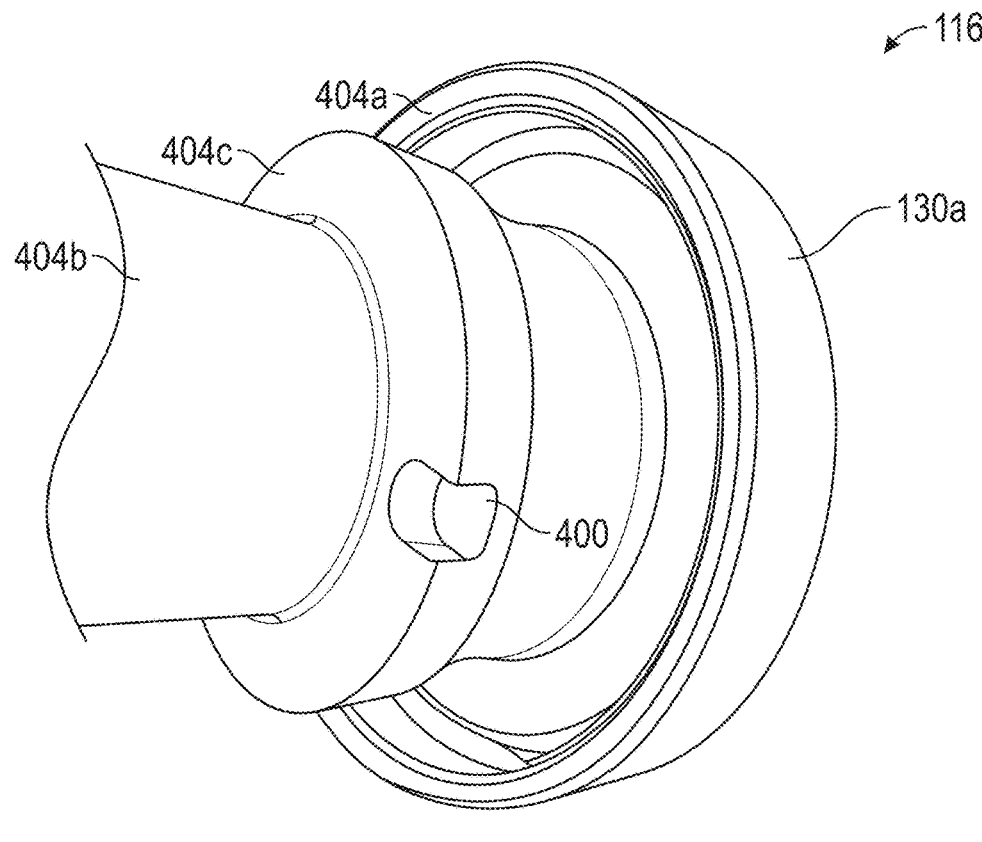
FIG. 10B is a perspective view of the cap with the driven gear removed.
Figure 10C:
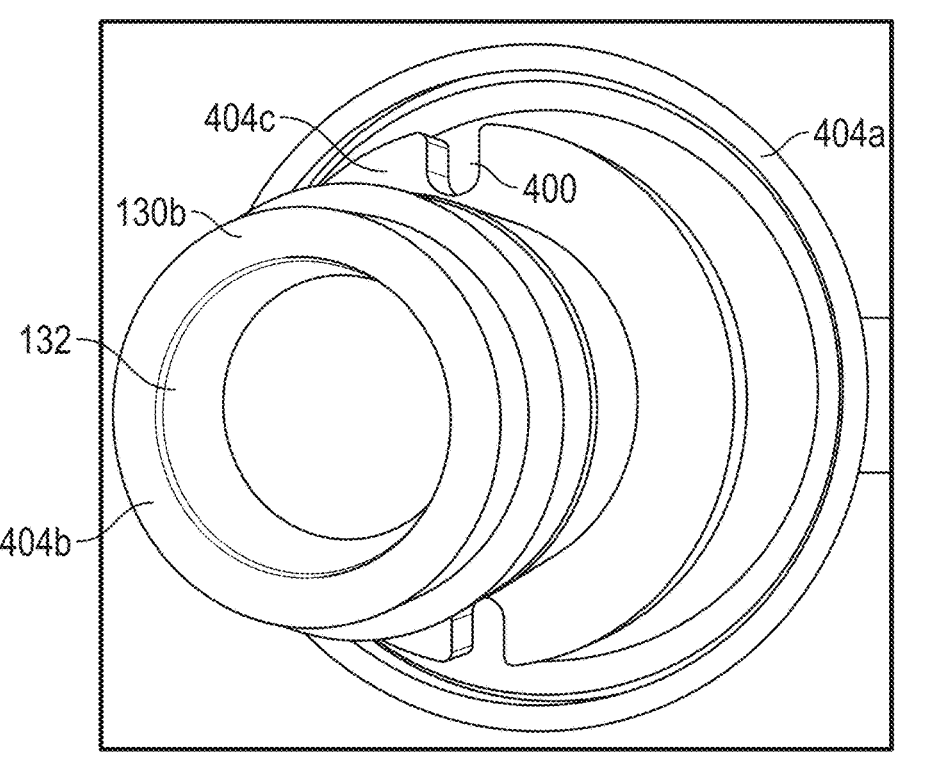
FIG. 10C is another perspective view of the cap.
Figure 10D:
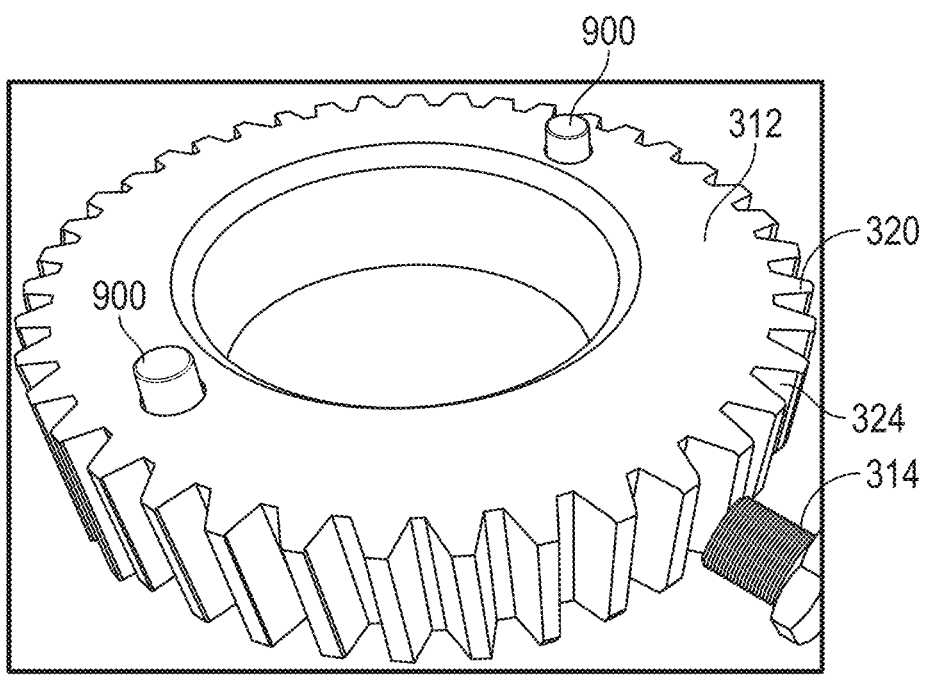
FIG. 10D is a perspective view of the driven gear.

Referring now to FIGS. 6, 7, 8, and 9, the bushing 216 may have a first bushing end 700a, a second bushing end 700b opposite the first bushing end 700a, a first portion 704a extending from the first bushing end 700a and abutting the sidewall 208 of the housing 112 adjacent to the side opening 212, and a second portion 704b extending from the second bushing end 700b and sized and dimensioned to extend through the side opening 212 into the inner cavity 300 (shown in FIG. 3) of the housing 112. Further, as shown in FIGS. 8 and 9, the bushing 216 may have a threaded inner surface 800 extending across the first portion 704a and the second portion 704b. In some implementations, at least a portion of the bushing 216 is constructed using a non-magnetic material. Constructing the bushing 216 using a non-magnetic material may prevent the bushing 216 from causing interference with the sensor assembly 316.

Referring now to FIGS. 10A-10D, the driven gear 312 is coupled to the cap 116 such that rotation of the driven gear 312 causes corresponding rotation of the cap 116. In some implementations, the driven gear 312 has one or more pins 900 engaging the one or more sockets 400 of the cap 116 to couple the driven gear 312 to the cap 116 such that rotation of the driven gear 312 causes corresponding rotation of the cap 116.

Figure 11A:
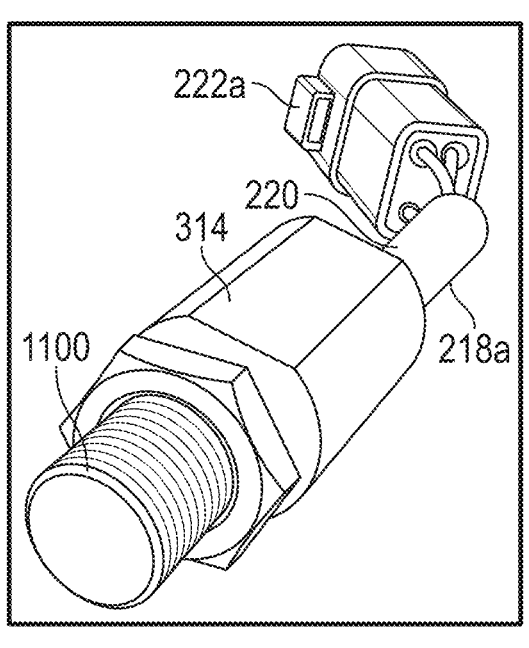
FIG. 11A is a perspective view of a sensor probe.
Figure 11B:
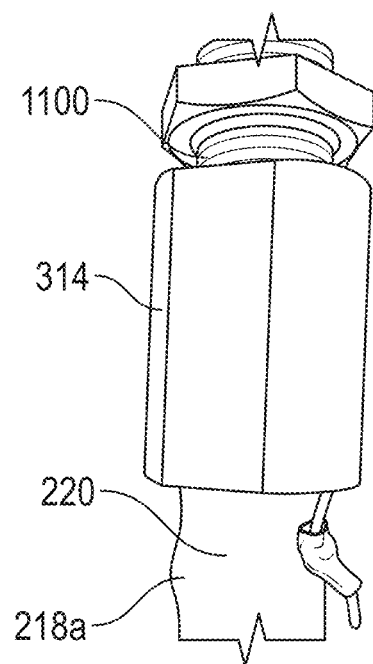
FIG. 11B is another perspective view of the sensor probe.

Referring now to FIGS. 11A and 11B, shown therein, is an exemplary implementation of the sensor probe 314 of the sensor assembly 316. As shown in FIGS. 11A and 11B, the sensor probe 314 may have a threaded outer surface 1100 configured to engage the threaded inner surface 800 of the bushing 216.

Referring now to FIG. 12A, shown therein is an exemplary implementation of a method 1200 of using the apparatus 100 as described herein. The method 1200 generally comprises the steps of: detecting, by the sensor assembly 316 disposed within the inner cavity 300 of the housing 112 of the apparatus 100 for rotating the sucker rod string 26, movement of the driven gear 312 of the apparatus 100 (step 1204); determining, by the sensor assembly 316, that the driven gear 312 has ceased movement for the predetermined time period (step 1208); and responsive to determining that the driven gear 312 has ceased movement for the predetermined time period, generating the alarm indicating that the driven gear 312 has ceased rotation (step 1212).

In some implementations in which the sensor assembly 316 comprises the speed switch 504, the step of detecting movement of the driven gear 312 of the apparatus 100 (step 1204) is further defined as detecting, by the speed switch 504, the movement of the plurality of teeth 320 circumferentially spaced about the driven gear 312.

Referring now to FIG. 12B, in some implementations in which the sensor assembly 316 further comprises the relay 508 and the sensor controller 500, the step of determining that the driven gear 312 has ceased movement for the predetermined time period (step 1208) generally comprises: determining, by the speed switch 504, that the plurality of teeth 320 have ceased movement (step 1216); responsive to determining that the plurality of teeth 320 have ceased movement, switching, by the speed switch 504, the relay 508 from the first state to the second state (step 1220); detecting, by the sensor controller 500, that the relay 508 has switched from the first state to the second state (step 1224); responsive to detecting that the relay 508 has switched from the first state to the second state, starting, by the sensor controller 500, a timer having the predetermined time period as a duration (step 1228); and detecting, by the sensor controller 500, that the duration of the timer has elapsed without the relay 508 having been switched from the second state to the first state, thereby determining that the driven gear 312 has ceased movement for the predetermined time period (step 1232).

In some such implementations, the step of generating the alarm indicating that the driven gear 312 has ceased rotation (step 1212) is further defined as, responsive to detecting that the duration of the timer has elapsed, generating, by the sensor controller 500, the alarm indicating that the driven gear 312 has ceased rotation.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred implementation. Further, the phrase "based on" is intended to mean "based, at least in part, on" unless explicitly stated otherwise.

What is claimed is:

1. An apparatus for rotating a sucker rod string, comprising:

a housing defining an inner cavity, an upper opening, and a lower opening, the lower opening sized and dimensioned to receive a first portion of the sucker rod string;

a cap disposed over the upper opening of the housing, the cap defining a rod opening aligned with the lower opening of the housing to receive a second portion of the sucker rod string spaced from the first portion, the cap engageable with the sucker rod string such that rotation of the cap causes rotation of the sucker rod string;

an actuator arm extending from the housing, the actuator arm moveable between a first position and a second position;

a driving gear disposed within the inner cavity of the housing, the driving gear mechanically coupled to the actuator arm such that movement of the actuator arm between the first position and the second position causes rotation of the driving gear;

a driven gear disposed within the inner cavity of the housing, the driven gear in meshing engagement with the driving gear such that rotation of the driving gear causes rotation of the driven gear, the driven gear coupled to the cap such that rotation of the driven gear causes corresponding rotation of the cap; and a sensor assembly disposed within the inner cavity of the housing, the sensor assembly configured to detect movement of the driven gear and, responsive to determining that the driven gear has ceased movement for a predetermined time period, generate an alarm indicating that the driven gear has ceased rotation.

2. The apparatus of claim 1, wherein the driven gear is constructed of an electrically conductive material.

3. The apparatus of claim 1, wherein the driven gear has a plurality of teeth circumferentially spaced about the driven gear, and wherein the sensor assembly detects movement of the plurality of teeth of the driven gear, determines that the plurality of teeth of the driven gear have ceased movement has ceased movement for the predetermined time period, and generates the alarm indicating that the driven gear has ceased rotation.

4. The apparatus of claim 1, wherein the sensor assembly comprises a relay and a speed switch, and wherein the apparatus further comprises a sensor controller, the relay switchable between a first state and a second state, the relay initially in the first state, the speed switch detects movement of the driven gear and, responsive to determining that the driven gear has ceased movement, switch the relay from the first state to the second state, the sensor controller configured to, responsive to determining that the relay has been in the second state for the predetermined time period, generate the alarm indicating that the driven gear has ceased rotation.

5. The apparatus of claim 4, wherein the speed switch is a ferrous target speed switch, and the driven gear is constructed using a ferrous metal.

6. The apparatus of claim 4, wherein the driven gear has a plurality of teeth circumferentially spaced about the driven gear, and the speed switch is further configured to detect movement of the teeth of the driven gear and, responsive to determining that the teeth of the driven gear have ceased movement for the predetermined time period, switch the relay from the first state to the second state.

7. The apparatus of claim 4, wherein the sensor controller is disposed outside of the housing, the housing further defining a side opening, the apparatus further comprising a bushing and a lead, the bushing disposed within the side opening and constructed using a non-magnetic material, the lead extending through the bushing and electrically coupled to the relay and the sensor controller.

8. The apparatus of claim 1, wherein the driving gear and the driven gear collectively form a worm drive, the driving gear being a worm screw having a first rotational axis, the driven gear being a worm gear having a second rotational axis, the first rotational axis and the second rotational axis being perpendicular.

9. The apparatus of claim 8, wherein the inner cavity of the housing has a screw portion and a gear portion with the driving gear disposed within the screw portion and the driven gear disposed within the gear portion, the driving gear having a cylindrical body, and wherein the apparatus further comprises a gasket disposed about the cylindrical body of the driving gear to prevent slippage of the driving gear within the screw portion of the inner cavity of the housing.

10. The apparatus of claim 1, wherein the predetermined time period is in a range between one minute and ten minutes.

11. The apparatus of claim 1, wherein the cap defines one or more sockets and the driven gear has one or more pins engaging the one or more sockets of the cap such that rotation of the driven gear causes corresponding rotation of the cap.

12. A sensor assembly, comprising:

a relay switchable between a first state and a second state, the relay initially in the first state;

a speed switch sized and dimensioned for insertion within an inner cavity of a housing of an apparatus for rotating a sucker rod string, the speed switch configured to detect movement of a driven gear of the apparatus and, responsive to determining that the driven gear has ceased movement, switch the relay from the first state to the second state; and a sensor controller configured to, responsive to determining that the relay has been in the second state for a predetermined time period, generate an alarm indicating that the driven gear has ceased rotation.

13. The sensor assembly of claim 12, wherein the speed switch is a ferrous target speed switch, and wherein the driven gear is constructed of a ferrous metal.

14. The sensor assembly of claim 12, wherein the speed switch is further configured to detect movement of a plurality of teeth circumferentially spaced about the driven gear and, responsive to determining that the teeth of the driven gear have ceased movement for the predetermined time period, switch the relay from the first state to the second state.

15. The sensor assembly of claim 12, further comprising a bushing and a lead, the bushing disposed within a side opening of the housing of the apparatus, the bushing constructed of a non-magnetic material, the lead electrically coupled to the relay and the sensor controller.

16. The sensor assembly of claim 12, wherein the predetermined time period is in a range between one minute and ten minutes.

17. A method, comprising:

detecting, by a sensor assembly disposed within an inner cavity of a housing of an apparatus for rotating a sucker rod string, movement of a driven gear of the apparatus;

determining, by the sensor assembly, that the driven gear has ceased movement for a predetermined time period; and responsive to determining that the driven gear has ceased movement for the predetermined time period, generating an alarm indicating that the driven gear has ceased rotation, wherein the sensor assembly comprises a speed switch, the step of detecting movement of the driven gear of the apparatus further defined as detecting, by the speed switch, movement of a plurality of teeth circumferentially spaced about the driven gear.

18. The method of claim 17, wherein the sensor assembly further comprises a relay and a sensor controller, the relay switchable between a first state and a second state, the relay initially in the first state, the step of determining that the driven gear has ceased movement for the predetermined time period further comprising:

determining, by the speed switch, that the plurality of teeth has ceased movement;

responsive to determining that the plurality of teeth have ceased movement, switching, by the speed switch, the relay from the first state to the second state;

detecting, by the sensor controller, that the relay has switched from the first state to the second state;

responsive to detecting that the relay has switched from the first state to the second state, starting, by the sensor controller, a timer having the predetermined time period as a duration; and detecting, by the sensor controller, that the duration of the timer has elapsed without the relay having been switched from the second state to the first state.

19. The method of claim 18, wherein the step of generating the alarm indicating that the driven gear has ceased rotation is further defined as, responsive to detecting that the duration of the timer has elapsed, generating, by the sensor controller, the alarm indicating that the driven gear has ceased rotation.

* * * * *